(12) United States Patent
Hui et al.

(10) Patent No.: US 7,088,978 B2
(45) Date of Patent: Aug. 8, 2006

(54) SYSTEM AND METHOD FOR INTERFERENCE CANCELLATION IN A WIRELESS COMMUNICATION RECEIVER

(75) Inventors: Dennis Hui, Cary, NC (US); Rajaram Ramesh, Cary, NC (US)

(73) Assignee: Ericsson Inc., Plano, TX (US)

( * ) Notice: Subject to any disclaimer, the term of this patent is extended or adjusted under 35 U.S.C. 154(b) by 271 days.

(21) Appl. No.: 10/360,032

(22) Filed: Feb. 7, 2003

(65) Prior Publication Data

US 2004/0198296 A1 Oct. 7, 2004

(51) Int. Cl.
*H04B 11/10* (2006.01)

(52) U.S. Cl. .................. 455/296; 455/278.1; 455/63.1; 375/285; 375/254

(58) Field of Classification Search ............... 455/296, 455/63.1, 273.1, 501, 283, 67.13, 67.14, 455/67.16, 65, 506, 504, 10, 323, 364, 303, 455/525, 425, 424, 561, 456.5, 456.6, 67.11, 455/550.1, 295, 277.2, 278, 1; 370/263, 370/208, 337, 347, 319, 231; 375/232, 284, 375/285, 283, 348, 332, 341, 346, 227, 316, 375/148, 233, 243, 340, 352, 345, 254; 768/322, 768/323; 329/318, 320, 349, 353; 364/724; 367/135, 901, 138, 87; 704/233; 702/190, 702/191, 199, 181
See application file for complete search history.

(56) References Cited

U.S. PATENT DOCUMENTS 4,530,076 A * 7/1985 Dwyer ......................... 367/135
5,640,429 A * 6/1997 Michels et al. ............. 375/340
6,590,932 B1 * 7/2003 Hui et al. .................... 375/232

2001/0050967 A1* 12/2001 Kuzminskiy et al. ....... 375/350
2002/0150180 A1* 10/2002 Malmberg et al. .......... 375/341
2002/0181390 A1* 12/2002 Mody et al. ................ 370/208
2003/0156539 A1* 8/2003 Bohnhoff et al. ........... 370/231

FOREIGN PATENT DOCUMENTS

GB 2314240 * 12/1997

OTHER PUBLICATIONS

Article entitled "TDMA Cellular Network Application of an Interference Cancellation Technique" by Pekka A. Ranta et al.; 1999 IEEE; (5 pages).
Zengjun Xiang et al: "Polynomial Perceptions and Their Applications to Fading Channel Equalization and Co-Channel Interference Suppression" IEEE Transactions on Signal Processing, IEEE, Inc. New York, US, vol. 42 No. 9, Sep. 1994, pp. 2470-2479, XP000477183 ISSN: 1053-587X.

* cited by examiner

*Primary Examiner*—Edward Urban
*Assistant Examiner*—Charles Chow
(74) *Attorney, Agent, or Firm*—Roger Burleigh (57) ABSTRACT

A communication receiver improves its channel estimation performance, its equalization performance, or both, by modeling the non-Gaussian characteristics of a dominant source of interference in a received signal. That is, rather than using Gaussian-based modeling, the receiver generates signal disturbance estimates using a probabilistic model representative of the non-Gaussian interference in a received signal, such as adjacent channel or co-channel signal interference in mobile station operating within a wireless communication network. The receiver may use such non-Gaussian interference modeling responsive to detecting such interference in the received signal and may match its disturbance model to the detected interference. Further, where signal disturbance is predominantly Gaussian in nature, the receiver may switch to a Gaussian disturbance model.

24 Claims, 7 Drawing Sheets

SYSTEM AND METHOD FOR INTERFERENCE CANCELLATION IN A WIRELESS COMMUNICATION RECEIVER

BACKGROUND OF THE INVENTION

The present invention generally relates to wireless communication systems and particularly relates to improving receiver performance by accounting for non-Gaussian interference in a received signal.

As the popularity of wireless communication services increases, network service providers must find ways to service greater numbers of users. More efficient spectrum usage through improved modulation and signal processing provide one mechanism for increasing the number of users that can be supported with a finite radio spectrum, and more aggressive frequency reuse in cellular network planning provides another. By more aggressively reusing frequencies within a cluster of radio coverage cells, system operators increase the aggregate number of users that can be supported but such gains come at the expense of increased mutual interference between users, e.g., increased co-channel and adjacent channel interference between users.

Generally, such mutual interference is characteristically non-Gaussian in terms of its probabilistic distribution. As such, adequate cancellation of such interference poses challenges for the Interference Canceling (IC) receiver because conventional approaches to interference cancellation, suppression, etc., are based on modeling received signal disturbances as explicitly or implicitly Gaussian in nature.

Of course, acceptable communication receiver performance depends on more than just the ability to adequately suppress mutual interference. Other phenomena, such as time-varying multipath fading, complicate wireless communications and require special operations to ensure suitable receiver performance. Such operations typically include channel estimation and, particularly with widely dispersive communication channels, signal equalization. Conventional approaches to these signal processing operations are based on the assumption that such signal disturbances can be modeled as Gaussian in nature. Thus, the performance of such operations may be compromised where a non-Gaussian interference source is the dominant cause of received signal disturbance.

SUMMARY OF THE INVENTION

The present invention comprises a method and apparatus to improve wireless receiver performance by using non-Gaussian models to compensate for a known or expected forms of non-Gaussian disturbance in a received signal. Signal disturbances in the received signal are estimated using a probabilistic model matched to the dominant source of interference in the received signal. In exemplary embodiments, the receiver generates a disturbance estimate by estimating one or more parameters that model the probabilistic characteristics of the non-Gaussian interference in combination with a Gaussian variance estimate. Such estimates may then be used to improve channel estimation, signal equalization, or both.

Generally, the receiver uses a known signal or a known portion of a received signal, such as a training sequence, to generate the one or more parameters used to characterize the Gaussian and non-Gaussian components of the received signal disturbances. Thus, in TDMA systems using burst signal transmissions, the receiver may use the training sequence transmitted in each burst to obtain a disturbance estimate for each burst, and then use that disturbance estimate to perform channel estimation and/or signal equalization for the unknown data received in the burst. Similarly, in CDMA applications, the receiver may use a pilot signal transmitted in association with an unknown traffic or control channel signal to obtain the disturbance estimate and then use that estimate in compensating the unknown traffic or control channel signal.

In an exemplary embodiment for improving channel estimation, the receiver generates initial channel and disturbance estimates based on receiving a known signal. For example, the receiver might employ Least Squares (LS) estimation assuming only Gaussian interference to obtain the initial channel estimate. Similarly, it might calculate the initial disturbance estimate based on the initial channel estimate and the known signal, or might simply initialize the disturbance estimate to arbitrary values. The receiver then generates a revised channel estimate using the disturbance estimate, and obtains a residual error value from that revised channel estimate from which it revises the variance of the Gaussian component of the disturbance estimate. This revision process may be iterated to obtain successively revised channel and disturbance estimates until an iteration criterion is satisfied, and such iterations may be repeated for each in a series of received signal bursts. Regardless, the receiver then uses the revised channel estimate to detect or otherwise process an unknown received signal received through the same or substantially the same channel.

Such channel estimation yields improvements in conventional signal equalization as applied to an unknown signal, and can be used to significant advantage even without modifying equalization operations to account for the non-Gaussian signal disturbance. However, further improvements in signal processing, i.e., lower bit error rate performance, may be obtained by adjusting the equalization operations to account for the non-Gaussian signal disturbance, even if the non-Gaussian channel estimation is not applied to the unknown received signal in advance of non-Gaussian equalization.

In an exemplary embodiment of non-Gaussian equalization, the branch metric conventionally used in Maximum Likelihood (ML) sequence estimation for Gaussian disturbances is modified with a correction term that accounts for the non-Gaussian disturbance of the received signal. Thus, according to the present invention, a ML sequence estimator, e.g., a Viterbi equalizer, identifies the maximally likely received data sequence for the unknown signal based on evaluating a branch metric that comprises, for example, a Euclidean distance term according to conventional sequence estimation metrics, and the aforementioned correction term. In an exemplary formulation, the correction term uses the same or similar parameters as the disturbance estimate used in exemplary non-Gaussian channel estimation.

More generally, inventive signal equalization as described herein performs signal equalization based on using an equalizer metric that includes some form or type of distance term in combination with a correction term that accounts for the non-Gaussian interference in the signal disturbance impairing a received signal. Such an equalizer metric may be applied to a wide variety of equalization processes, including Decision Feedback Sequence Estimation (DFSE) and Reduced State Sequence Estimation (RSSE) equalization processes.

While the present invention has applicability in both CDMA and TDMA networks, it has particular advantages for use in communication networks susceptible to adjacent and co-channel interference, where the dominant source of received signal interference is another communication signal having known modulation characteristics. As such, a receiver according to the present invention may model the disturbances in a received signal based on the detected or assumed modulation characteristics of an interfering communication signal. For example, where the dominant source of interference comprises a Gaussian Minimum Shift Keying (GMSK) signal, an exemplary embodiment of the inventive receiver generates a disturbance estimate matched to the non-Gaussian characteristics of that signal type. For GMSK interference, the receiver generates a parameter to estimate the constant signal envelope of the interfering GMSK signal, a parameter to estimate the signal phase, and a parameter to estimate the envelope variance and generally account for estimation shortcomings.

Of course, the receiver may use other disturbance models and in general matches the probabilistic model to the actual or assumed dominant source of interference. Thus, where the dominant interfering signal is an 8PSK modulated signal, the receiver generates its disturbance estimate parameters based on a probability distribution model matched to that signal type. Further, the receiver may dynamically switch between different channel estimation and equalization schemes based on, for example, the nature of interference detected in a received signal. Thus, a receiver according to the present invention may switch between Gaussian and non-Gaussian interference models as needed or as appropriate.

DETAILED DESCRIPTION OF THE INVENTION

Figure 1:
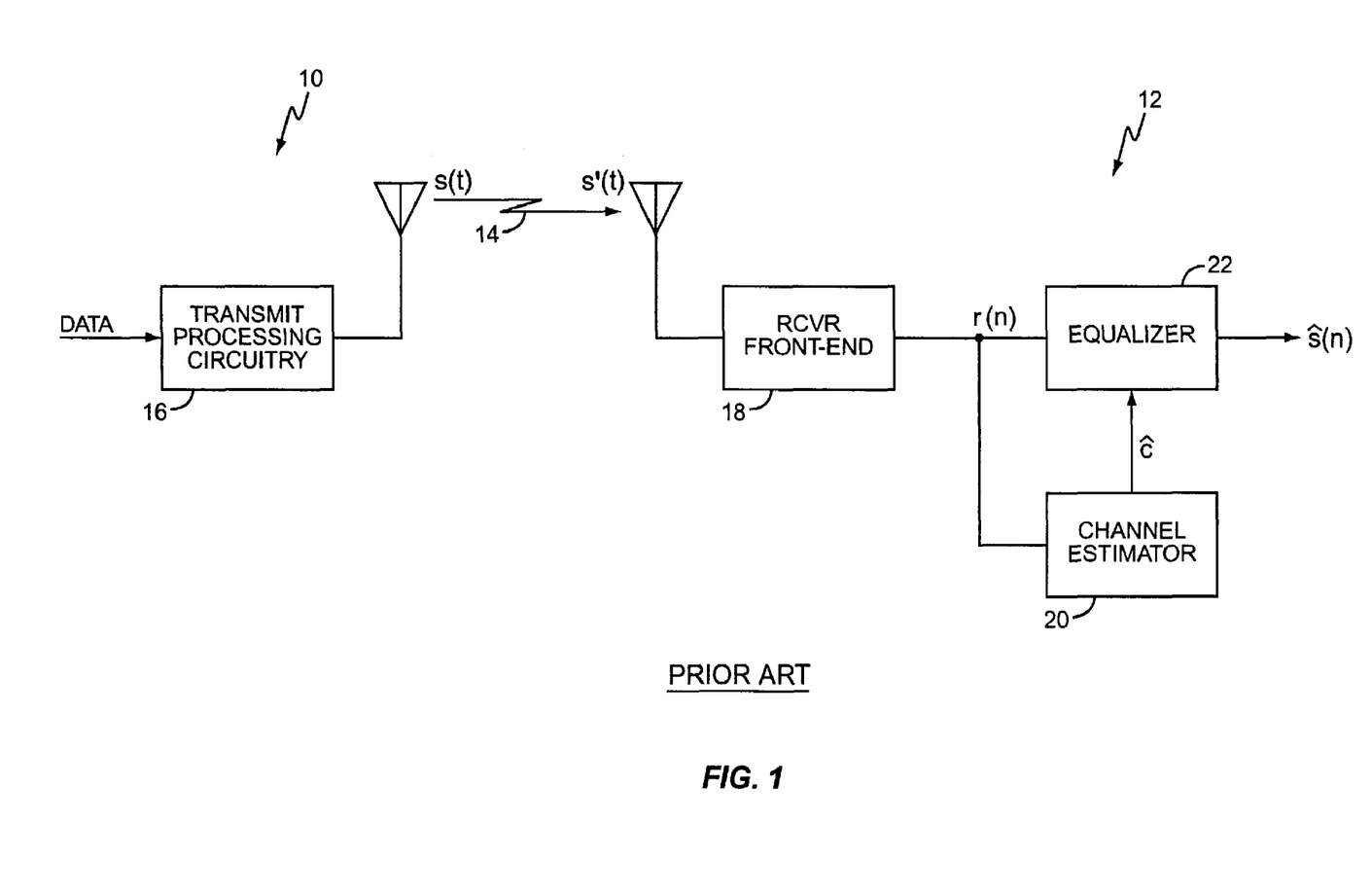
FIG. 1 is a diagram of a conventional receiver-transmitter pair.

FIG. 1 depicts a simplified, conventional transmitter-receiver pair, including a transmitter 10 for transmitting a signal s(t) to a receiver 12 through a communication channel 14. Transmitter 10 includes transmit processing circuitry 16 for generating a modulated transmission signal s(t) from baseband data. Signal s(t) is transmitted through communication channel 14 to receiver 12, which includes a receiver front-end 18, a channel estimator 20, an equalizer 22 and additional decoding and processing circuitry (not shown).

The signal s'(t) received at receiver 12 differs from the transmitted signal because of the deleterious effects of one or more sources of signal disturbance. First, as is well understood in the wireless communication art, the channel 14, which may include portions of the transmitter 10 and receiver 12, imparts phase and amplitude distortion and may cause multipath interference. Generally, both s'(t) and the discrete time signal r(n) suffer from the effects of interference and noise. Additionally, r(n) typically suffers from noise and certain receiver impairments, such as dc offsets, phase noise, etc., but which are often small in comparison to external disturbance sources.

To combat signal disturbance, the receiver 12 estimates the channel effects using channel estimator 20, which typically produces an estimate of the communication channel's response such that the estimated response may be used in, for example, signal equalization to more or less cancel out the channel effects. Of course, such cancellation typically is imperfect owing to the dynamic nature of the channel being estimated. Equalizer 22 may then be used to at least partially cancel the effects of Inter-Symbol Interference (ISI) from the received signal r(n).

Conventional channel estimation is based on receiver 12 determining channel coefficients based on receiving a signal including known data. Such known data might comprise a training sequence of known data symbols or may be a known pilot signal. With such an approach, the received signal can be modeled as $$r(n) = \sum_{k=0}^{L-1} c(k)s(n-k) + v(n) \quad n = L-1, L, \cdots, N-1, \tag{1}$$

where $\{c(k)\}_{k=0}^{L-1}$ denotes the channel response to be estimated, $\{s(n)\}$ denotes the transmitted symbols, and $\{v(n)\}$ denotes an additive disturbance signal which may be a mixture of external interference, such as co-channel interference, and background thermal noise.

Over a training sequence, say $\{s(n)\}_{n=0}^{N-1}$, with N training symbols, Equation (1) can be written in matrix form as $$r = Sc + v, \tag{2}$$

where $r = (r(L-1), r(L), \ldots, r(N-1))^T$, $c = (c(0), c(1), \ldots, c(L-1))^T$, $v = (v(L-1), v(L), \ldots, v(N-1))^T$, and where $$S = \begin{pmatrix} s(L-1) & s(L-2) & \cdots & s(0) \\ s(L) & s(L-1) & \cdots & s(1) \\ \vdots & & & \vdots \\ s(N-1) & s(N-2) & \cdots & s(N-L) \end{pmatrix}.$$

One of the most commonly used methods for estimating the channel c in (2) is the least squares (LS) channel estimation. The LS estimate of c given r is $$\hat{c}_{LS} = (S^H S)^{-1} S^H r. \tag{3}$$

It is known that the LS channel estimate is the maximum-likelihood (ML) channel estimate when the signal disturbance $\{v(n)\}$ is assumed to have a (white) Gaussian probability distribution. Indeed, even more sophisticated conventional channel estimation methods implicitly or explicitly assume Gaussian signal disturbance distributions. However, in a typical capacity-limited cellular system, the signal disturbance $\{v(n)\}$ is often dominated by co-channel interference whose probability distribution is often far from Gaussian.

Such distribution assumptions further find their way into conventional equalization. The most commonly used branch metric for equalization by Maximum Likelihood (ML) sequence estimation is the Euclidean (distance) metric:

$$dM = \left| r(n) - \sum_{k=0}^{L-1} \hat{c}(k)s(n-k) \right|^2, \quad (4)$$

where $\{\hat{c}(k)\}$ denotes the output of the channel estimator, i.e., denotes the estimated channel response. Thus, equalizer 22 might use a Viterbi algorithm with the above branch metric to compute a sequence estimate $\{\hat{s}(n)\}$ of transmitted data symbols.

Similar to LS channel estimation, the branch metric in (4) will lead to an ML sequence estimate of transmitted symbols only when the signal disturbance $\{v(n)\}$ impairing the received signal $r(n)$ has a (white) Gaussian probability distribution. Since the distribution of co-channel interference is often far from Gaussian, the use of such a branch metric often is sub-optimal.

Figure 2:
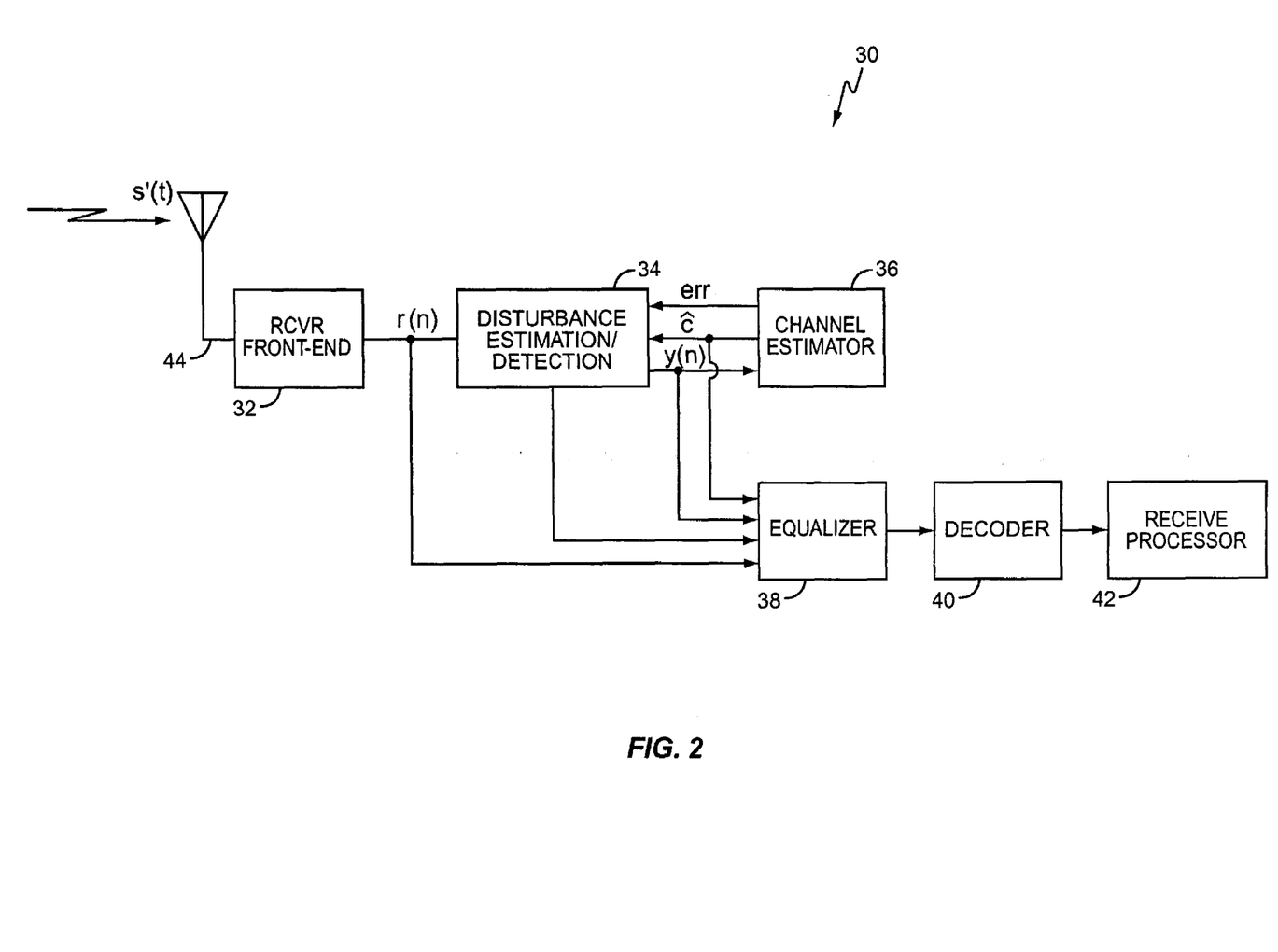
FIG. 2 is a diagram of an exemplary receiver according to one embodiment of the present invention.

FIG. 2 illustrates an exemplary receiver 30 in accordance with one embodiment of the present invention. Here, receiver 30 comprises a receiver front-end 32, a disturbance estimator 34, a channel estimator 36, an equalizer 38, a decoder 40, a receive processor 42, and an antenna assembly 44.

Disturbance estimator 34, which may include a disturbance detection/characterization function, provides a basis for improved channel estimation and signal equalization by modeling disturbance of the received signal $r(n)$ according to the non-Gaussian probability distribution(s) of the actual signal disturbances. Thus, rather than basing channel estimation and/or signal equalization on Gaussian distribution models, the inventive receiver 30 models the probabilistic characteristics of non-Gaussian signal disturbance in the received signal, which, in some cases, is known or assumed to be the dominant source of interference in the received signal $r(n)$. Thus, disturbance estimator 34 may generate one or more estimation parameters modeled on the actual probability distributions of the dominant signal disturbance in $r(n)$, and such parameters may be used to modify operation of channel estimator 36 and/or equalizer 38.

Figure 3:
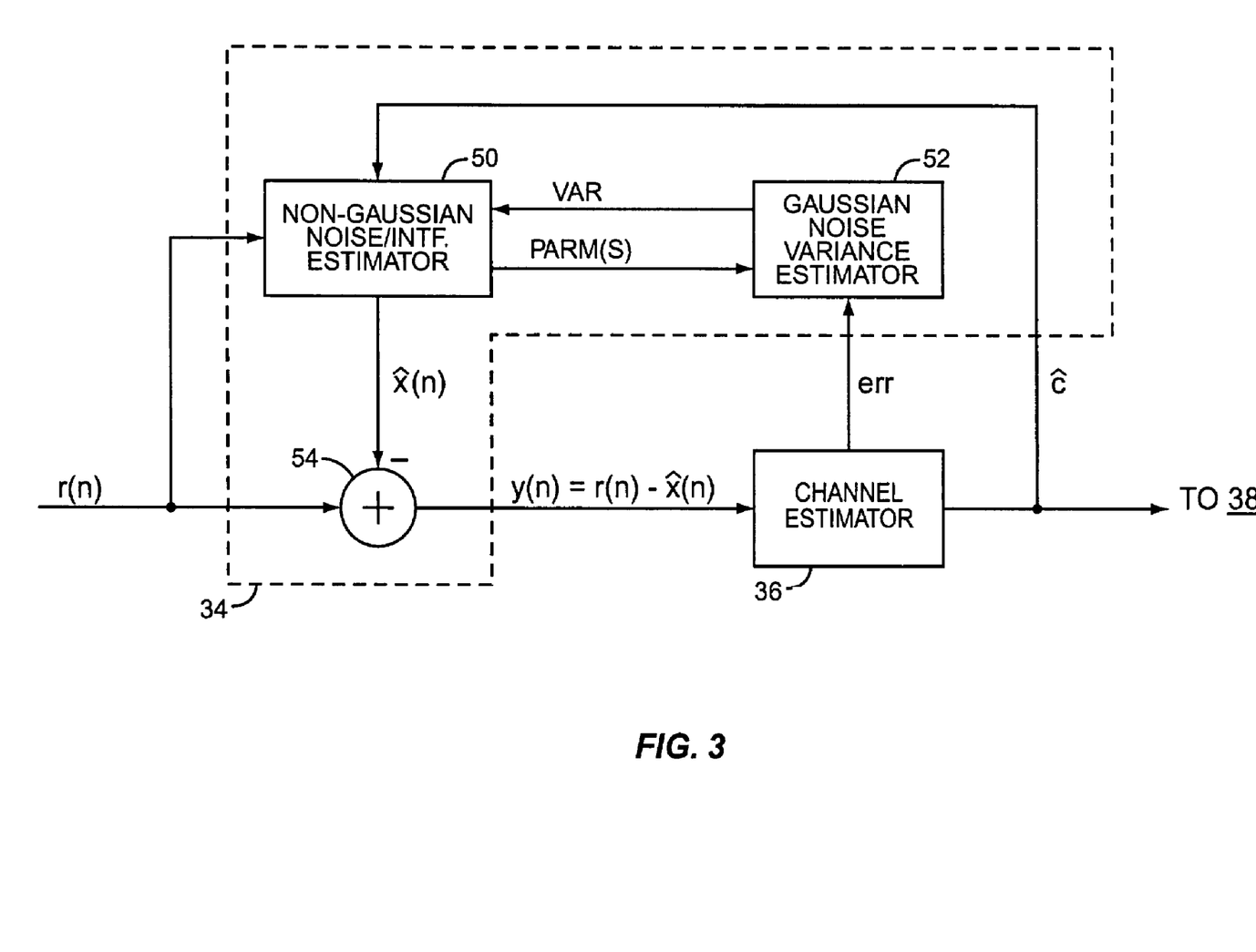
FIG. 3 is a diagram of an exemplary disturbance estimator according to the receiver of FIG. 2.

FIG. 3 depicts an exemplary functional arrangement for receiver 30. Disturbance estimator 34, which generates disturbance estimates, comprises a first estimator 50 that estimates a first, non-Gaussian component of the signal disturbance impairing the received signal $r(n)$, a second estimator 52 that estimates a second, Gaussian component of the signal disturbance, and a summing circuit 54 that generates a residual signal for use in, among other things, improved channel estimation.

More particularly, the first estimator generates a disturbance estimate $\hat{x}(n)$, which is subtracted from the received signal $r(n)$ to generate the residual signal $y(n)$. This residual signal is then used to revise the channel estimate $\hat{c}$ generated by channel estimator 36. Channel estimator 36 further provides an error signal (err) to the second estimator 52 of disturbance estimator 34, which uses that error signal to revise its estimate of the Gaussian component of the signal disturbance. In turn, that revised estimate may be used by the disturbance estimator 34 to revise or otherwise update $\hat{x}(n)$.

In broad terms, an exemplary embodiment of receiver 30 models the non-Gaussian probability characteristics of signal disturbance in the received signal based on generating a disturbance estimate that comprises a non-Gaussian component and a Gaussian component. In other words, an exemplary embodiment of receiver 30 models the signal disturbance that impairs the received signal as a non-Gaussian component and a Gaussian component.

The non-Gaussian component of the disturbance estimate models the probability distribution function of the non-Gaussian interference in the received signal, while the Gaussian component of the disturbance estimate models the Gaussian portion of the signal disturbance. Thus, the Gaussian component of the disturbance estimate, which is a variance or covariance estimate in an exemplary embodiment, may be used to account for Gaussian noise, such as thermal noise, phase noise, and other sources of Gaussian impairment, as well as to account for estimation errors in the non-Gaussian component of the disturbance estimate.

Where the Gaussian component of the signal disturbance is "white," receiver 30 may simply generate the Gaussian component of the disturbance estimate as a variance estimate, and may assume a mean value of zero. However, where the Gaussian component of the signal disturbance is "colored," receiver 30 may generate the Gaussian component of the disturbance estimate as a covariance function to account for inter-sample dependencies. To that end, receiver 30 may process received signal samples, particularly known portions thereof, to characterize the Gaussian disturbance component and selectively generate variance or covariance values as appropriate.

Indeed, one or more exemplary embodiments of receiver 30 may process the received signal to identify whether signal disturbances impairing the received signal include non-Gaussian interference and selectively apply non-Gaussian modeling in its channel estimation operations. Thus, if the received signal is not significantly impaired by non-Gaussian interference, receiver 30 may perform channel estimation based on LS estimation techniques.

However, for signal disturbance that includes non-Gaussian interference, the baseband signal model used by receiver 30 may be formed as $$r(n) = \sum_{k=0}^{L-1} c(k)s(n-k) + p_1(n) + p_2(n) \quad n = L-1, L, \cdots, N-1, \quad (5)$$

where $p_1(n)$ is the non-Gaussian component of signal disturbance and $p_2(n)$ is the Gaussian component of the signal disturbance. In matrix form, Equation (5) may be written as $$r = Sc + p_1 + p_2 \quad (6)$$

where $r$, $c$, and $S$ are defined as before. Comparison of Equations (2) and (6) make clear that unlike the conventional receiver, receiver 30 in this embodiment of the present invention models the signal disturbance in $r(n)$ as the sum of non-Gaussian and Gaussian components.

Because receiver 30 gains improved reception performance by specifically considering the non-Gaussian characteristics of signal disturbance, possibly on a selective basis, $p_1(n)$ comprises one or more estimated parameters that model the non-Gaussian probability distribution function of the known or assumed source of non-Gaussian interference in the received signal $r(n)$. Thus, the particular construction of $p_1(n)$ depends on the nature of the non-Gaussian signal disturbance.

Figure 4:
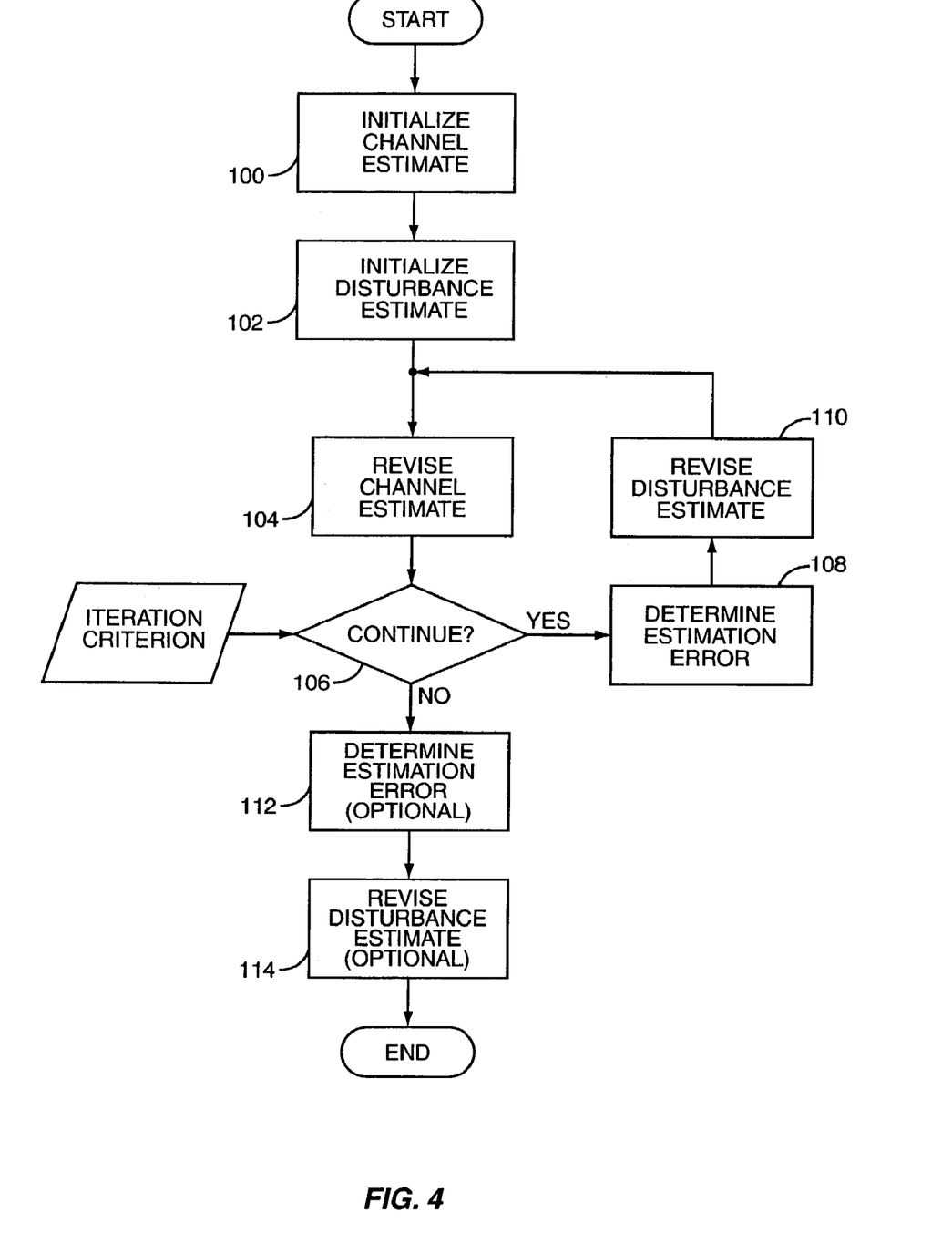
FIG. 4 is a diagram of exemplary disturbance estimation logic.

FIG. 4 illustrates receiver logic for improving channel estimation according to an exemplary embodiment of the present invention. Processing begins with receiver 30 receiving a known signal comprising, for example, a sequence of known data symbols. Receiver 30 generates an initial channel estimate ĉ according to, for example, a conventional LS estimation algorithm described in Equations (2) and (3). Thus, receiver 30 obtains the initial channel estimate without need for specifically modeling the non-Gaussian characteristics of the signal disturbance (Step 100).

Receiver 30 also generates an initial disturbance estimate based on initializing the parameters used to model $p_1(n)$ and $p_2(n)$ in Equations (5) or (6) above (Step 102). Note that the initial disturbance estimate may be generated before generation of the initial channel estimate (Step 100, above), or in parallel with the previous estimation step. Thus, it should be understood that the sequential depiction of initialization steps provides a basis for explanatory discussion but should not be construed as limiting the actual implementation of the present invention.

Thus, disturbance estimator 34 initializes one or more parameters used to specifically characterize the non-Gaussian and Gaussian components of the signal disturbance. Such initialization may involve computing initial parameter values, obtaining initial values from look-up tables stored in receiver memory for example, or essentially any other mechanism for setting or calculating initial values for the disturbance parameters.

Receiver 30 then revises the initial channel estimate using the initial disturbance estimate (Step 104). If the process is to continue, such as where a "stopping" criterion is not yet satisfied (Step 106), the receiver 30 determines an error signal representative of a channel estimation error (Step 108), and uses that error term to revise the initial disturbance estimate (Step 110). In an exemplary embodiment, the error term is used to revise the variance or covariance function of the Gaussian component of the disturbance estimate. The receiver 30 then obtains a revised channel estimate from the revised disturbance estimate (Step 104), and determines whether to repeat the iterative revision of the disturbance and channel estimates (Step 106).

Assuming the "stopping" criterion is satisfied after one or more such iterations, processing may end (skipping optional steps 112 and 114) and the revised channel estimate may then be used to demodulate an unknown portion of the received signal r(n), or to demodulate any unknown signal received by receiver 30 having the same or substantially similar channel conditions. Also, note that even if the channel and disturbance estimates are not iteratively revised for iterative improvement of the channel estimate, i.e., no looping from Step 106, the estimation error may be determined and the disturbance estimate may be revised (optional steps 112 and 114). Performing these optional steps provides a revised disturbance estimate that may be used in later signal equalization even if that revised disturbance estimate is not used to revise the channel estimate.

Regardless, those skilled in the art will recognize that an exemplary disturbance estimate used to obtain an improved channel estimate and/or improved signal equalization is formed in accordance with the known or assumed characteristics of the specific disturbance(s) impairing the received signal r(n). As a specific example, the dominant source of non-Gaussian interference in the signal disturbance impairing the received signal r(n) may be an interfering GMSK-modulated signal, such as co-channel or adjacent channel interference that receiver 30 might encounter if it is operating in a GSM (or GSM/EDGE) wireless communication network.

In applying the logic of FIG. 4 to this specific GSM interference example, one notes that a GMSK signal exhibits a constant amplitude envelope in combination with a variable phase. Thus, Equation (5) may be recast specifically for GMSK signal disturbance as $$r(n) = \sum_{k=0}^{L-1} c(k)s(n-k) + a_o e^{j\theta(n)} + w(n) \quad n = L-1, L, \cdots, N-1, \tag{7}$$

where $a_o e^{j\theta(n)}$ represents $p_1(n)$ and thus comprises the non-Gaussian component, $w(n)$ represents $p_2(n)$, and where $\{\theta(n)\}$ denotes a sequence of independent and identically distributed random variables that are uniformly distributed on $[-\pi,\pi)$, and $\{w(n)\}$ denotes white Gaussian background noise of variance $\sigma^2$. In matrix form, Equation (7) can be written as $$r = Sc + a_o u + w, \tag{8}$$

where $u = (e^{j\theta(L-1)}, e^{j\theta(L)}, \ldots, e^{j\theta(N-1)})^T$, $w = (w(L-1), w(L), \ldots, w(N-1))^T$, and where r, c, and S are defined as before. Thus, receiver 30 may jointly estimate the channel c, the amplitude $a_0$ of the constant-envelope (CE) component of the signal disturbance, and the variance $\sigma^2$ of the Gaussian component of the signal disturbance.

For the initial iteration (m=0), receiver 30 may generate the channel estimate $\hat{c}^{(0)}$ according to, for example, the conventional LS estimation algorithm outlined in Equation (3) above. Receiver 30 may generate the initial amplitude estimate $\hat{a}_0^{(0)}$ as an arbitrary value, such as 1.0, or it may be computed by $$\hat{a}_0^{(0)} = \frac{1}{N-L+1} \sum_{n=L-1}^{N-1} \left| r(n) - \sum_{k=0}^{L-1} \hat{c}^{(0)}(k)s(n-k) \right|. \tag{9}$$

Similarly, the initial noise variance estimate $(\hat{\sigma}^{(0)})^2$ may be set to an arbitrary value, such as 0.1, or it may be computed by $$(\hat{\sigma}^{(0)})^2 = \frac{1}{N-L+1} \sum_{n=L-1}^{N-1} \left| r(n) - \sum_{k=0}^{L-1} \hat{c}^{(0)}(k)s(n-k) \right|^2 - (\hat{a}_0^{(0)})^2. \tag{10}$$

Additionally, a phase parameter estimate $\hat{u} = [\hat{u}(l-1), \ldots, \hat{u}(n-1)]$ may be initialized as $$\hat{u}(n) = e^{j\phi_{\hat{z}^{(0)}(n)}} \frac{I_1\left(\frac{2\hat{a}_0^{(0)}|\hat{z}^{(0)}(n)|}{(\hat{\sigma}^{(0)})^2}\right)}{I_0\left(\frac{2\hat{a}_0^{(0)}|\hat{z}^{(0)}(n)|}{(\hat{\sigma}^{(0)})^2}\right)}, \quad \text{for } n = L-1, L, \cdots, N-1, \tag{11}$$

where $$\hat{z}^{(0)}(n) = r(n) - \sum_{k=0}^{L-1} \hat{c}^{(0)}(k)s(n-k), \phi_{\hat{z}^{(0)}(n)}$$

denotes the phase of $\hat{z}^{(0)}(n)$, and where $I_n(x)$ denotes the modified Bessel functions of the first kind of order n.

With these initial estimates, the receiver 30 then obtains a revised channel estimate as $$\hat{c}^{(m+1)} = (S^H S)^{-1} S^H (r - \hat{a}_0^{(m)} \hat{u}) \quad (12)$$

From this revised channel estimate, the receiver 30 may revise its Gaussian variance estimate as well as its phase and amplitude parameter estimates in the next iteration, which may then be used to further revise the channel estimate, and so on. Such iterative operations may continue until a stopping or other iteration criterion is met, such as whether $$\frac{\|\hat{c}^{(m+1)} - \hat{c}^{(m)}\|^2}{\|\hat{c}^{(m)}\|^2} < \varepsilon, \quad (13)$$

where ϵ represents a defined threshold for the estimation metric expressed in Equation (13) and as such may be used to stop iteration once the difference between the channel estimate obtained in the current iteration and the channel estimate obtained in the prior iteration falls below a defined threshold. Of course, other stopping criterion may be used in combination or in the alternative, such as simply iterating until m>M, where m is the current iteration count and M is an iteration limit. If the stopping criterion is not met, the iteration count m is increased by one, and the next iteration begins.

Specifically, in each subsequent iteration, receiver 30 obtains an error term from the previous channel estimate as err=r−S$\hat{c}^{(m)}$, which enables receiver 30 to revise its Gaussian variance estimate as $$(\hat{\sigma}^{(m)})^2 = \frac{1}{N-L+1} \|err - \hat{a}_0^{(m-1)} \hat{u}\|^2 + (\hat{a}_0^{(m-1)})^2 \left(1 - \frac{\|\hat{u}\|^2}{N-L+1}\right) \quad (14)$$

using the previous phase parameter estimate û. Then, using the revised variance estimate, receiver 30 may estimate the phase parameter as $$\hat{u}(n) = e^{j\phi_{\hat{z}^{(m)}(n)}} \frac{I_1\left(\frac{2\hat{a}_0^{(m-1)}|\hat{z}^{(m)}(n)|}{(\hat{\sigma}^{(m)})^2}\right)}{I_0\left(\frac{2\hat{a}_0^{(m-1)}|\hat{z}^{(m)}(n)|}{(\hat{\sigma}^{(m)})^2}\right)}, \text{ for } n = L-1, L, \ldots, N-1, \quad (15)$$

where $$\hat{z}^{(m)}(n) = r(n) - \sum_{k=0}^{L-1} \hat{c}^{(m)}(k) s(n-k), \phi_{\hat{z}^{(m)}(n)}$$

denotes the phase of $\hat{z}^{(m)}(n)$, and where $I_n(x)$ denotes the modified Bessel functions of the first kind of order n. It should be noted that well known numerical routines exist for computing the modified Bessel function $I_0(z)$ and $I_1(z)$ shown in Equations (11) and (15). Further, during iteration, receiver 30 may estimate the amplitude parameter as $$\hat{a}_0^{(m)} = \left[\frac{\text{Re}\{\hat{u}^H (I - S(S^H S)^{-1} S^H) r\}}{(N-L+1) - \hat{u}^H S(S^H S)^{-1} S^H \hat{u}}\right]^+, \quad (16)$$

where $\hat{u} = (\hat{u}(L-1), \hat{u}(L), \ldots, \hat{u}(N-1))^T$, I is the identity matrix, and for any real number x, $$[x]^+ = \begin{cases} x & \text{if } x \geq 0 \\ 0 & \text{if } x < 0. \end{cases} \quad (17)$$

With the revised û and $\hat{a}_0^{(m)}$ shown in (15) and (16) respectively, Equation (12) can be used again to further revise the channel estimate.

Figure 5:
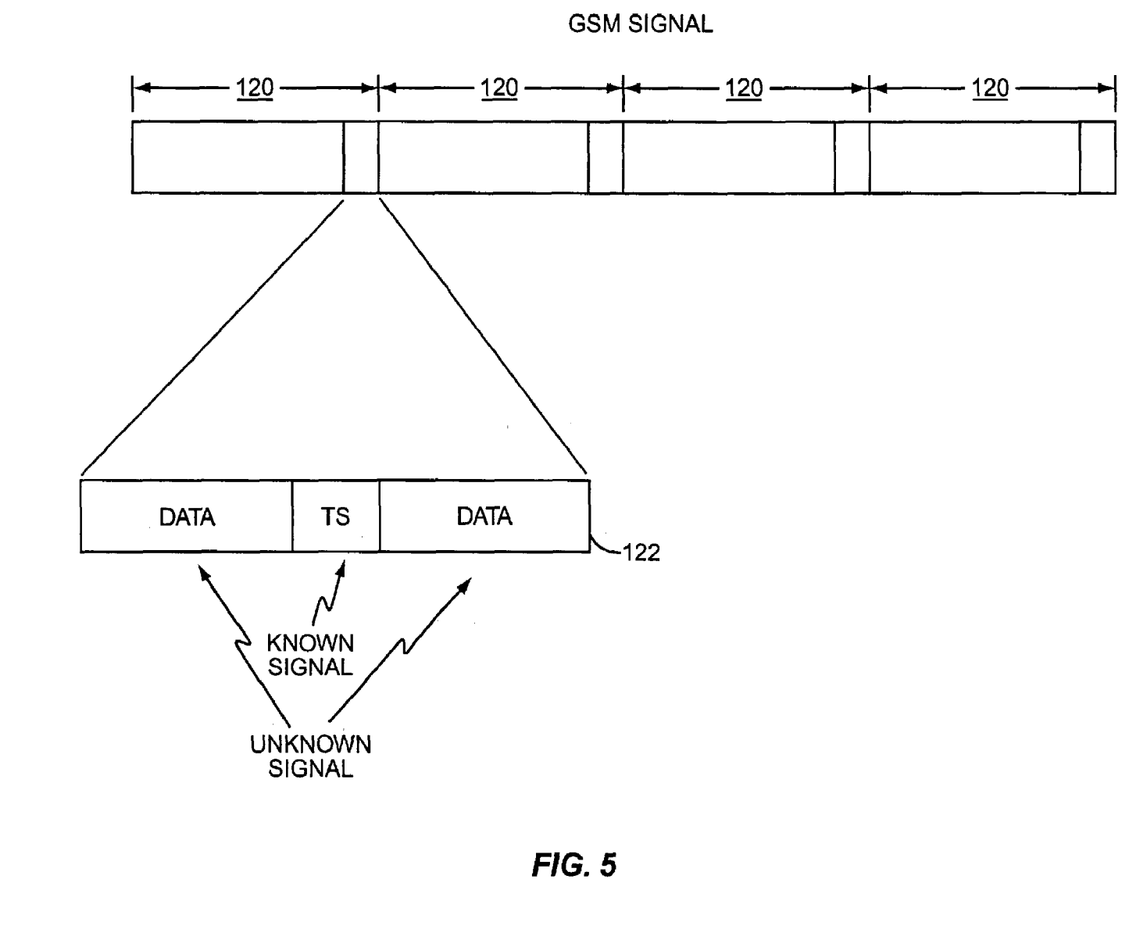
FIG. 5 is a diagram of a GSM signal.

FIG. 5 illustrates an exemplary application for iterative channel estimation. Here, the received signal r(n) is a GSM signal comprising repeating signal frames 120, with each frame comprising slots 122, and wherein individual mobile stations are served based on assiging specific slots 122 in each repeating frame 120 to specific mobile stations. Thus, in this context, the received signal r(n) comprises successively received burst transmissions (slot transmissions), with the signal received at a given mobile station during each assigned slot 122 comprising unknown data in combination with known data, i.e., a training sequence of known data symbols to be used for channel estimation. Thus, receiver 30 is, in one exemplary embodiment, configured to perform iterative channel estimation according to the above details in each slot 122. That is, receiver 30 iteratively obtains a new channel estimate in each slot 122 to be used for detecting, such as by demodulation, the unknown portions of the received signal r(n) received in that slot 122.

Of course, the disturbance estimates used by receiver 30 may be formed differently according to the particular characteristics of the dominant source of non-Gaussian interference in the signal disturbance impairing the received signal. Thus, the disturbance estimate parameters would change, for example, if the dominant source of interference was an interfering 8PSK signal, or some other modulated communication signal having known or determinable signal characteristics. In general, the exemplary receiver 30 generates the non-Gaussian component of its disturbance estimate based on the known or assumed probability distribution function of the non-Gaussian interference in the signal disturbance. As such, the disturbance estimate may be matched to the particular characteristics of a dominant interfering signal.

Figure 6A:
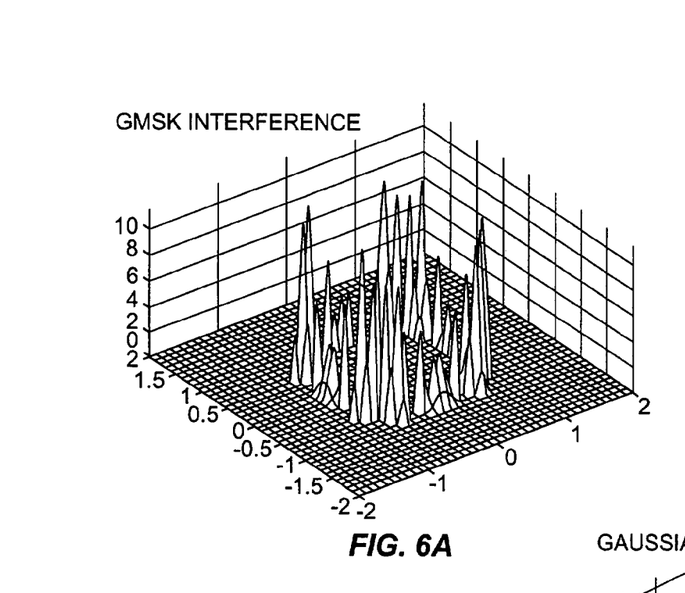
FIGS. 6A–6C are diagrams of marginal distributions for various types of signal disturbance.
Figure 6B:
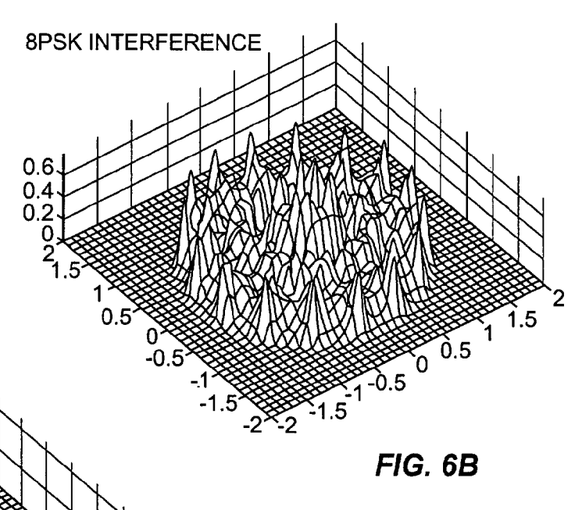
Figure 6C:
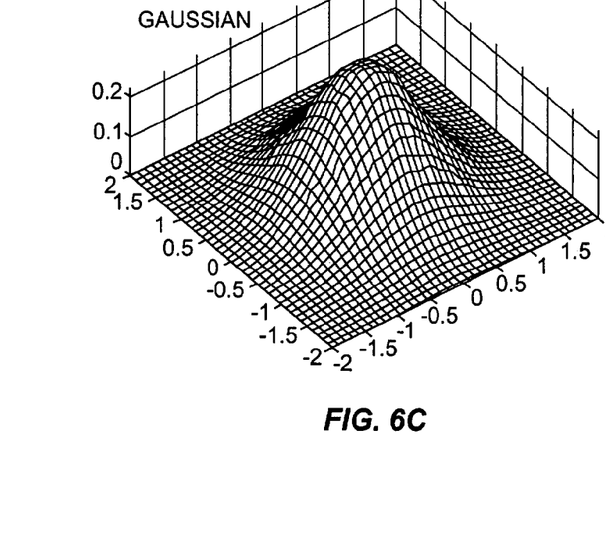

FIGS. 6A–6C illustrate the marginal distributions of interference associated with GMSK, 8PSK and Gaussian interference sources. Disturbance estimator 34 may, in one or more embodiments of the present invention, be configured to detect the type of dominant interference in a received signal and adjust its disturbance modeling accordingly. That is, disturbance estimator 34 might dynamically configure its disturbance modeling parameters to match the detected probabilistic characteristics of received signal interference. In other embodiments, disturbance estimator 34 might be configured to use default modeling parameters based on an assumed or expected type of interfering signal. Such embodiments might be particularly useful where receiver 30 senses a level or amount of interference in the received signal without attempting to characterize its probabilistic characteristics. In such circumstances, a default interference model may be used if interference is above a defined threshold.

In turning to exemplary improvements in signal equalization according to the present invention, it should be noted that such improvements may be obtained with or without use of improved channel estimation. Of course, in an exemplary embodiment, the performance improvements are most fully realized by incorporating improved channel estimation and improved signal equalization into receiver 30.

Regardless, an exemplary embodiment of improved signal equalization modifies a conventional ML sequence estimation branch metric, or other type of equalization metric, through use of a correction term. The correction term may be formed using one or more parameters that model the non-Gaussian characteristics of the received signal disturbance such as was described above for improved channel estimation. Thus, the exemplary equalization metric for improved signal equalization is expressed as $$dM = \text{Distance term} + \text{Correction term}, \quad (18)$$

where the correction term is based on modeling the non-Gaussian probabilistic characteristics of the dominant signal disturbance. Expressed in terms of an interfering GMSK signal as discussed above, an equalization metric expressed in branch metric terms for use in a Viterbi equalization process is given as $$dM = \left| r(n) - \sum_{k=0}^{L-1} \hat{c}(k)s(n-k) \right|^2 - \hat{\sigma}^2 \ln I_o \left( \frac{2\hat{a}_o \left| r(n) - \sum_{k=0}^{L-1} \hat{c}(k)s(n-k) \right|}{\hat{\sigma}^2} \right), \quad (19)$$

where $\{\hat{c}(k)\}, \hat{a}_o, \hat{\sigma}$ are the same as the outputs of the channel estimation algorithm detailed above.

When using the proposed branch metric with the conventional Viterbi algorithm, equalizer 38 produces a ML sequence estimate of transmitted data symbols in consideration of the non-Gaussian nature of the dominant interference in the received data symbols. Thus, the specific probability characteristics of the dominant received signal disturbance are expressed as branch correction term that is used to improve the sequence estimation operations of equalizer 38. With the GMSK signal example, equalizer 38 models the signal disturbance as a mixture of background noise and co-channel interference with constant envelope characteristics. In other words, the novel equalizer 38 accounts for the specific probability distribution of the constant-envelope GMSK interference.

The inventive channel estimation and equalization methods yield significant performance improvements in simulations using the GSM/EDGE air interface. For example, assuming (1) a single GMSK-modulated co-channel interfering signal, (2) background noise at $E_b/N_o = 30$ dB, and (3) a non-dispersive fading medium at a speed of 3 km/hr for both the desired and the interfering signal, the inventive channel estimation method yields a gain of about 1 dB as compared to conventional LS channel estimation. Where such channel estimation is combined with the inventive signal equalization described herein, performance gains of 18 dB and 4.5 dB over the conventional Euclidean equalizer metrics and LS channel estimation have been observed for non-dispersive and Typical Urban (TU) fading media, respectively.

Figure 7:
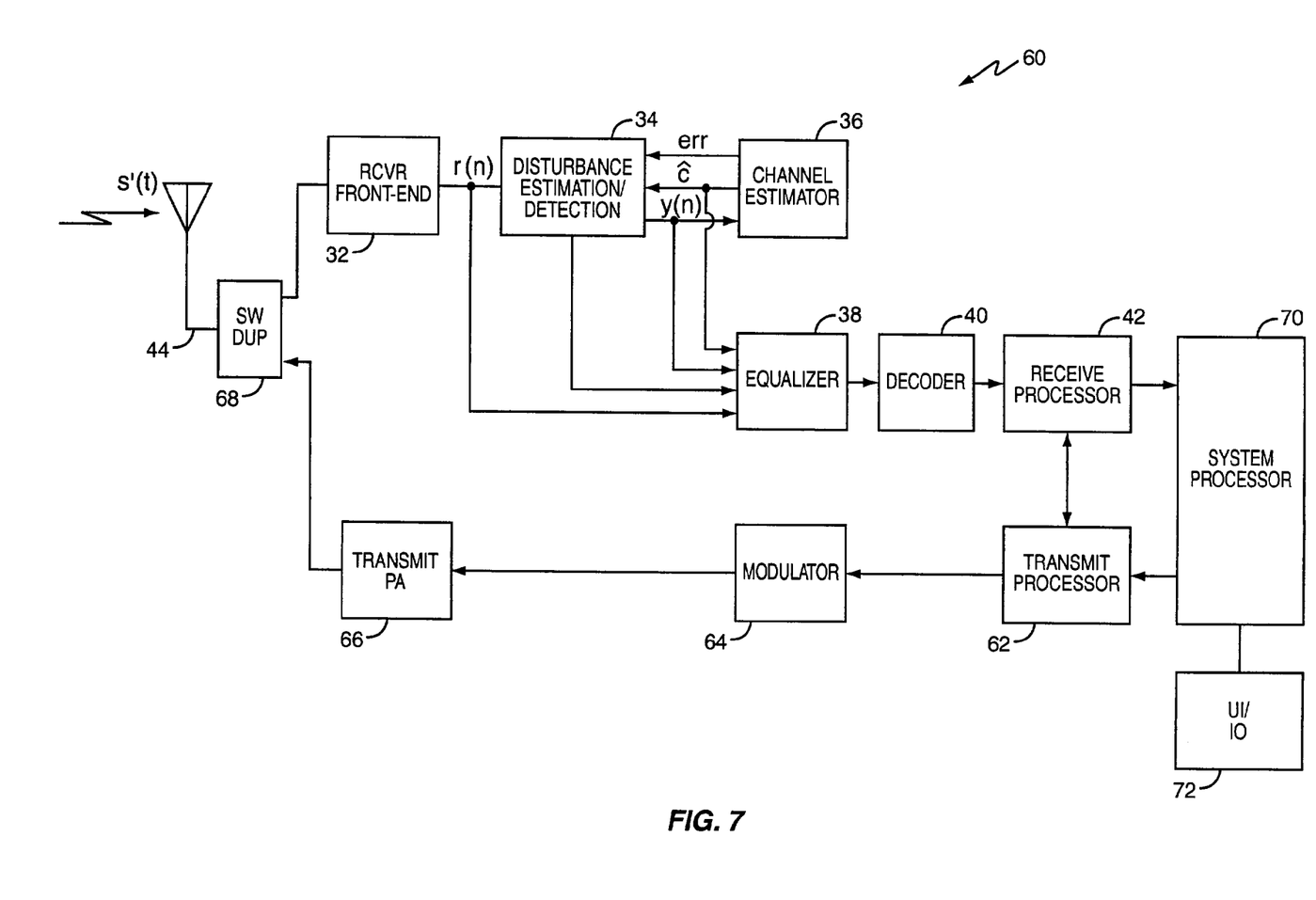
FIG. 7 is a diagram of an exemplary mobile station according to one embodiment of the present invention.

As such, the channel estimation and/or equalization methods and apparatus of the present invention may be advantageously incorporated into a wireless communication device such as a wireless mobile station for use in a wireless communication network. FIG. 7 illustrates an exemplary mobile station (MS) 60 that incorporates an exemplary embodiment of receiver 30 described above. MS 60 further includes a transmitter comprising transmit processor 62, modulator 64 and transmit power amplifier (PA) 66, switch/duplexer 68, system processor 70 and user interface/system I/O circuits 72.

Mobile station 60 may employ one or both improved channel estimation and improved signal estimation according to the present invention, and it should be noted that mobile station 60 may be configured to operate in essentially any type of wireless communication network, including IS-136, GSM, GSM/EDGE, IS-95 (cdmaOne), IS-2000 (cdma2000), Wideband CDMA (WCDMA), etc.

Further, it should be noted actual implementation of the present invention is subject to variation. For example, in an exemplary embodiment, the disturbance estimator 34, channel estimator 36 and signal equalizer 38 are implemented in one or more computer processors, such as one or more Digital Signal Processors (DSPs) or programmable devices configured for such signal processing. As such, some or all of receiver 30 may be implemented as part of a baseband processor circuit that includes receive processor 42, disturbance estimator 34, channel estimator 36 and signal equalizer 38. Therefore, those skilled in the art will recognize that the inventive channel estimation and signal equalization operations detailed above may be implemented in hardware, software (or firmware), or any combination thereof. Any required supporting information, such as look-up table data and/or default value data for parameter initialization may be stored in memory within receiver 30, such as within non-volatile memory the contents of which are accessible for purposes of parameter estimation.

Regardless of the implementation specifics, the present invention provides a receiver 30 that improves channel estimation and/or signal equalization based on modeling received signal disturbance as a combination of non-Gaussian and Gaussian components. More particularly, where the dominant source of signal disturbance is non-Gaussian, receiver 30 models the probability characteristics of that disturbance to obtain improved channel estimates, an improved branch metric for signal equalization, or to obtain both. In addition to its exemplary use in Viterbi equalization, the present invention may be used advantageously with other types of equalizers, such as in DFSE or RSSE equalization processes, with the method modified accordingly. Thus, the present invention may be used to account for non-Gaussian signal disturbance across a wide range of equalizer types. In these and other aspects, implementation details of the present invention may be varied as needed or desired. Therefore, the present invention is not limited by the exemplary details above. Indeed, the present invention is limited only by the following claims and their reasonable equivalents.

What is claimed is:

1. A method of improving performance in a wireless communication receiver comprising the steps of:
   receiving a known signal at the receiver that is impaired by signal disturbance that includes non-Gaussian interference;

performing channel estimation to obtain a channel estimate based on the known signal and modeling the probabilistic characteristics of the non-Gaussian interference, comprising the steps of:

a) modeling the signal disturbance as Gaussian and non-Gaussian disturbance components by generating a disturbance estimate for the signal disturbance as 1) a first, non-Gaussian component, comprising generating one or more parameters to model a non-Gaussian probability distribution function associated with the non-Gaussian interference, wherein the one or more parameters are based on knowledge of a signal type associated with the non-Gaussian interference, and 2) a second. Gaussian component; and, b) performing channel estimation based on the disturbance estimate; and, detecting an unknown signal received at the receiver using the channel estimate.

2. The method of claim 1, wherein receiving a known signal at the receiver comprises receiving a training sequence within a burst signal comprising the training sequence and unknown data such that detecting the unknown signal comprises detecting the unknown data in the burst signal.

3. The method of claim 1, wherein receiving a known signal at the receiver comprises receiving a pilot signal, and wherein detecting an unknown signal received at the receiver comprises demodulating traffic or control data transmitted in association with the pilot signal.

4. The method of claim 1, wherein the non-Gaussian interference is an interfering GMSK signal, and wherein generating the one or more parameters to model a non-Gaussian probability distribution of the non-Gaussian interference comprises defining an amplitude parameter to model a constant envelope of the interfering GMSK signal, and a phase parameter to model a phase of the interfering GMSK signal.

5. The method of claim 1, wherein generating a second, Gaussian component of the signal disturbance comprising generating a variance or covariance estimate for the signal disturbance.

6. The method of claim 1, wherein performing channel estimation to obtain a channel estimate using the known signal based on modeling the probabilistic characteristics of the non-Gaussian interference comprises:

initializing a channel estimate;

initializing a disturbance estimate for the known signal as a first, non-Gaussian component and a second, Gaussian component; and revising the channel estimate based on the disturbance estimate.

7. The method of claim 6, further comprising iteratively obtaining revised channel and disturbance estimates.

8. The method of claim 7, further comprising iteratively revising the channel and disturbance estimates until an iteration criterion is satisfied.

9. The method of claim 8, wherein detecting an unknown signal received at the receiver using the channel estimate comprises detecting the unknown signal using the iteratively revised channel estimate.

10. The method of claim 6, wherein initializing a channel estimate comprises initially determining the channel estimate from the known signal using a Least Squares (LS) estimation technique that does not model the non-Gaussian interference impairing the known signal.

11. The method of claim 6, wherein initializing a channel estimate comprises evaluating the known signal including impairments in conjunction with nominal values of the known signal.

12. The method of claim 11, wherein revising the channel estimate based on the disturbance estimate comprises determining a difference between the known signal including impairments and the first component of the disturbance estimate.

13. The method of claim 11, further comprising revising the disturbance estimate as a function of the revised channel estimate to obtain a revised disturbance estimate for use in a subsequent revision of the channel estimate.

14. The method of claim 1, further comprising determining whether signals received at the receiver are impaired by non-Gaussian interference and selectively performing channel estimation based on modeling the non-Gaussian probability characteristics of the signal disturbance.

15. A wireless communication receiver comprising:

a receiver front-end to obtain a received signal from a received transmit signal:

a disturbance estimator to generate a disturbance estimate that models the probability characteristics of non-Gaussian interference impairing the received signal, comprising a receive processing circuit configured to:

generate a disturbance estimate for the non-Gaussian interference based on an initial channel estimate and a probabilistic model of the non-Gaussian interference; and generate a residual signal based on the received signal and the disturbance estimate; and a channel estimator to generate a channel estimate for the received signal based on the disturbance estimate, wherein the channel estimator is configured to compute a revised channel estimate using the residual signal and y obtain an error signal characterizing a channel estimate error, and the disturbance estimator is configured to compute a variance or covariance estimate and thereby update the disturbance estimate for subsequent generation of the residual signal and revision of the channel estimate.

16. The receiver of claim 15, wherein the channel estimator comprises a processing circuit configured to determine the channel estimate based on evaluating a residual value determined from a known portion of the received signal and the disturbance estimate.

17. The receiver of claim 16, wherein the disturbance and channel estimator cooperate to iteratively generate revised channel and disturbance estimates until an iteration criterion is satisfied.

18. The receiver of claim 15, wherein the disturbance estimator comprises:

a first estimation circuit to generate a disturbance estimate of non-Gaussian disturbance for the received signal;

a summing circuit to generate a first residual signal based on the received signal and the disturbance estimate; and a second estimator to generate a variance estimate for the disturbance estimate based on an error signal characterizing an error of the channel estimate.

19. The receiver of claim 18, wherein the channel estimator comprises a channel estimation circuit to generate the channel estimate from the residual signal, and to generate the error signal.

20. A wireless communication receiver comprising:
a receiver front-end to obtain a received signal from a received transmit signal, wherein the received signal is impaired by signal disturbance including non-Gaussian interference;
a disturbance estimator to generate a disturbance estimate for the received signal based on modeling the probability characteristics of the non-Gaussian interference, comprising:
a first estimation circuit to generate a first, non-Gaussian component of the disturbance estimate based on modeling the probability distribution function of the non-Gaussian interference; and
a second estimation circuit to generate a second, Gaussian component of the disturbance estimate; and
an equalizer to generate a sequence estimate for the received signal based on an equalizer metric that includes a correction term based on the disturbance estimate.

21. The receiver of claim 20, wherein the equalizer comprises a portion of a baseband processing circuit.

22. The receiver of claim 20, wherein the equalizer defines the equalizer metric as a distance metric term and the correction term such that the correction term accounts for the non-Gaussian Interference in the received signal.

23. The receiver of claim 20, wherein the disturbance estimator comprises a receiver processing circuit configured to generate the disturbance estimate using a probabilistic model of the non-Gaussian interference.

24. The receiver of claim 20, wherein the disturbance estimator generates the second component of the disturbance estimate as a variance estimate for the signal disturbance.

* * * * *